US010992832B2

(12) United States Patent
Nakayama

(10) Patent No.: US 10,992,832 B2
(45) Date of Patent: Apr. 27, 2021

(54) IMAGE FORMING APPARATUS

(71) Applicant: CANON KABUSHIKI KAISHA, Tokyo (JP)

(72) Inventor: Yoshiyuki Nakayama, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/415,401

(22) Filed: May 17, 2019

(65) Prior Publication Data
US 2019/0364163 A1 Nov. 28, 2019

(30) Foreign Application Priority Data
May 24, 2018 (JP) .............................. JP2018-099854

(51) Int. Cl.
H04N 1/00 (2006.01)
G06F 3/12 (2006.01)

(52) U.S. Cl.
CPC ..... H04N 1/00525 (2013.01); H04N 1/00551 (2013.01); H04N 1/00572 (2013.01); H04N 1/00989 (2013.01); *H04N 2201/0094* (2013.01)

(58) Field of Classification Search
CPC ........... H04N 1/00525; H04N 1/00551; H04N 1/00572; H04N 2201/0094; H04N 1/00978; H04N 1/00981; H04N 1/00984; H04N 1/00986; G06F 1/20; G06F 1/203; G06F 2200/202; G06F 2200/203; H05K 7/20
USPC ......... 358/1.1, 1.11–1.18; 399/110, 114, 107
See application file for complete search history.

(56) References Cited

U.S. PATENT DOCUMENTS

| 6,266,498 | B1* | 7/2001 | Oda | H04N 1/00976 347/138 |
| 6,510,301 | B2* | 1/2003 | Tanaka | G03G 15/605 399/125 |
| 6,611,667 | B2* | 8/2003 | Kaiho | G03G 15/6552 399/405 |
| 2004/0228647 | A1* | 11/2004 | Kida | G03G 21/206 399/92 |
| 2005/0031371 | A1* | 2/2005 | Kaida | G03G 21/1628 399/110 |
| 2005/0074255 | A1* | 4/2005 | Awaya | G03G 21/206 399/92 |
| 2005/0196217 | A1* | 9/2005 | Nishimura | G03G 15/6552 400/693 |
| 2007/0047028 | A1* | 3/2007 | Hashimoto | H04N 1/00543 358/498 |

(Continued)

FOREIGN PATENT DOCUMENTS

JP 2011-123112 A 6/2011

*Primary Examiner* — Chad Dickerson
(74) *Attorney, Agent, or Firm* — Canon U.S.A., Inc. I.P. Division

(57) ABSTRACT

An image forming apparatus includes an apparatus body including an image forming portion configured to form an image on a sheet, a rotating unit disposed above the apparatus body and rotatably supported around a first rotary shaft with respect to the apparatus body, and a cover portion rotatably supported around a second rotary shaft extending in parallel to the first rotary shaft with respect to the apparatus body. The rotating unit and the cover portion are opened from a front side of the image forming apparatus to a rear side of the image forming apparatus. The second rotary shaft is disposed on the rear side of the first rotary shaft.

5 Claims, 17 Drawing Sheets

(56) References Cited

U.S. PATENT DOCUMENTS

| | | | | |
|---|---|---|---|---|
| 2007/0110469 A1* | 5/2007 | Kasai | ............... | G03G 21/206 |
| | | | | 399/93 |
| 2013/0255989 A1* | 10/2013 | Ito | ............... | G03G 21/1652 |
| | | | | 174/60 |
| 2013/0287433 A1* | 10/2013 | Ito | ............... | G03G 21/1647 |
| | | | | 399/107 |
| 2013/0314731 A1* | 11/2013 | Omi | ............... | H04N 1/00278 |
| | | | | 358/1.13 |

* cited by examiner

FIG.8
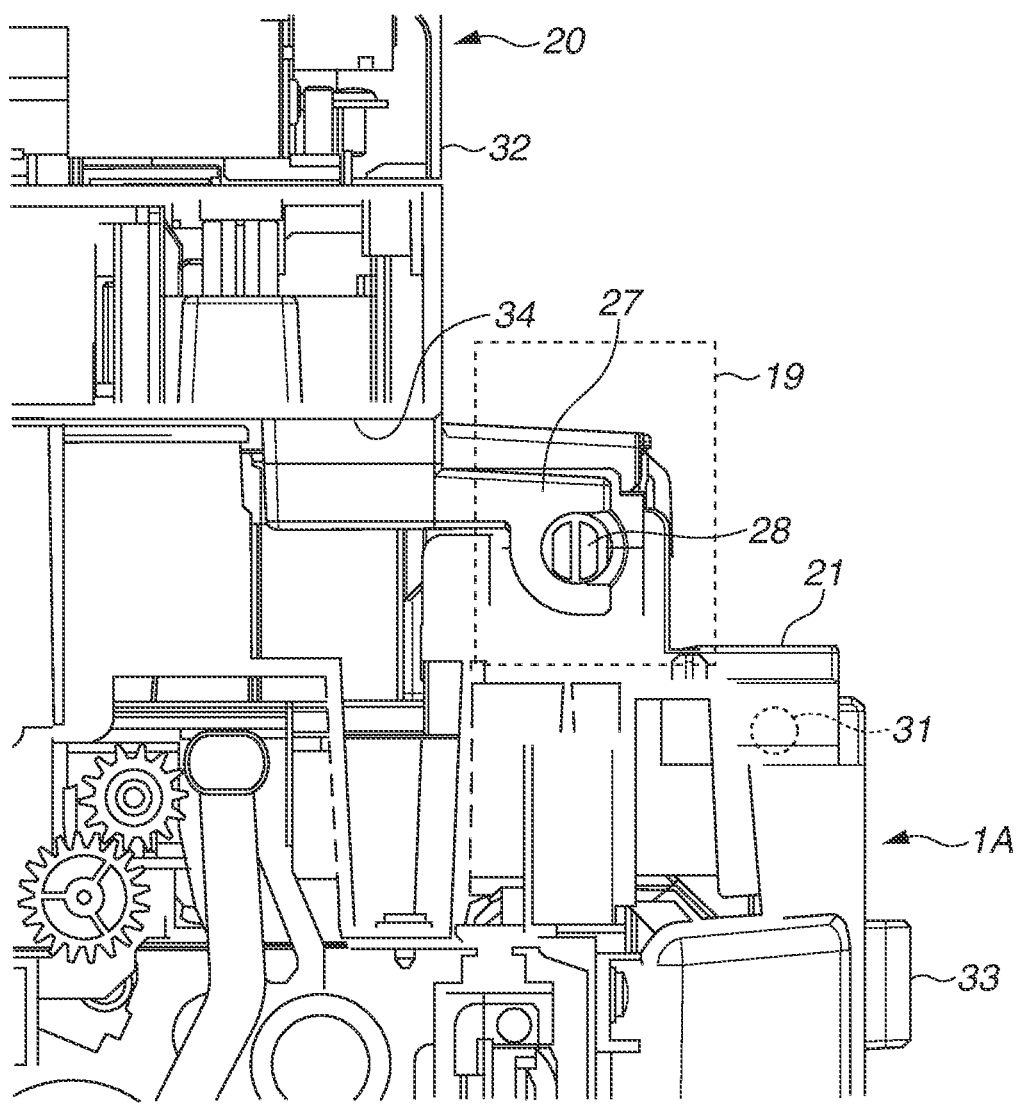
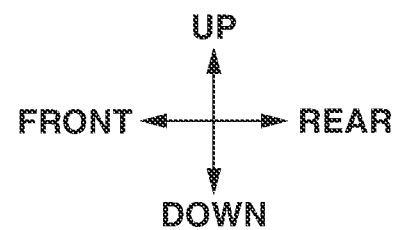

FIG.9
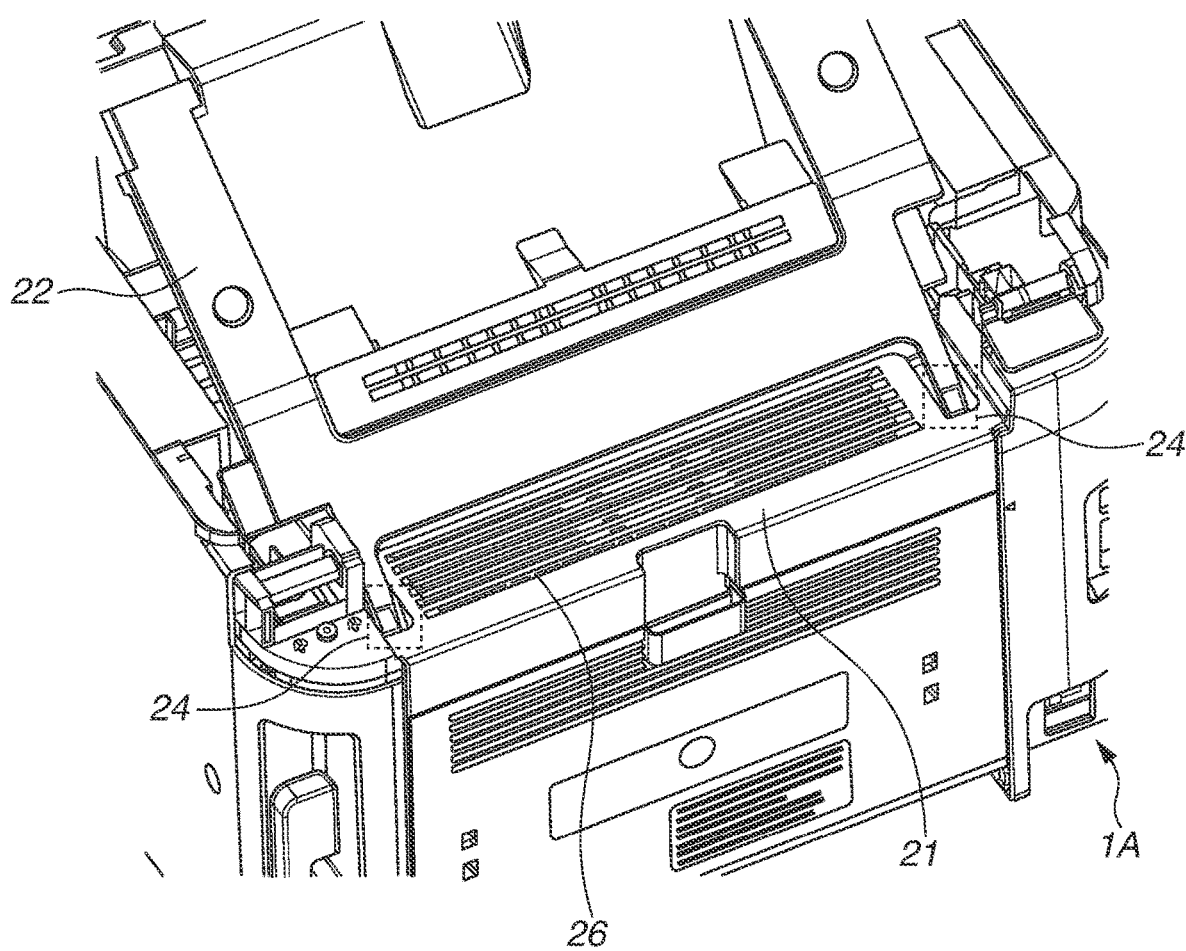
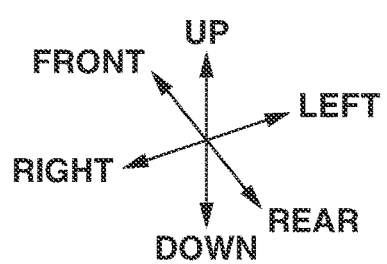

FIG.10
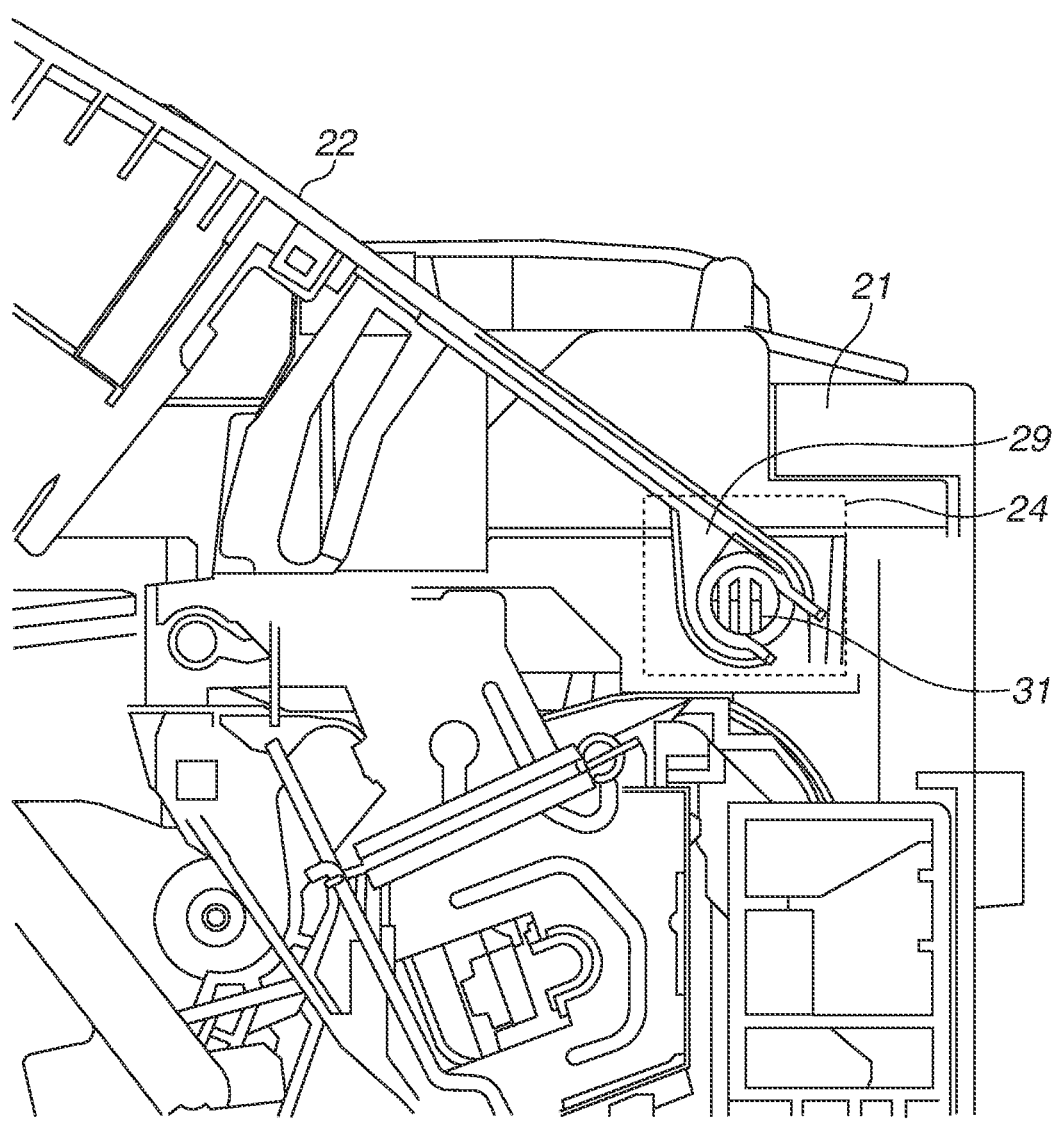
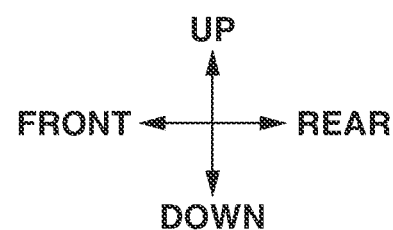

IMAGE FORMING APPARATUS

BACKGROUND OF THE INVENTION

Field of the Invention

The present disclosure relates to an image forming apparatus that forms an image on a sheet.

Description of the Related Art

As illustrated in FIG. 17, a multi-function peripheral 100 including a multi-function peripheral body that forms an image on a sheet, and an image reading portion 80 that is swingably supported at a swing fulcrum 81 of the multi-function peripheral body has heretofore been proposed (see Japanese Patent Application Laid-Open No. 2011-123112). In the case of replacing a toner cartridge in the multi-function peripheral 100, a user grips a lower portion of an operation panel 80b to move the image reading portion 80 upward. In this case, the image reading portion 80 and a top cover 83 are coupled with a link member 87. Accordingly, the top cover 83 also swings upward around a swing fulcrum 85 along with the swinging motion of the image reading portion 80.

When the image reading portion 80 swings to a predetermined open angle, a support arm 90 which is provided to the image reading portion 80 engages with an engagement portion (not illustrated) of the multi-function peripheral body, and the image reading portion 80 and the top cover 83 are held in an open state. In this state, the user replaces the toner cartridge.

The swing fulcrum 85 of the top cover 83 is disposed at a position close to a central portion of the multi-function peripheral body, and the toner cartridge is disposed in the vicinity of the swing fulcrum 85. A work space for cartridge replacement work, which appears when the top cover 83 is in the open state, is narrow in the vicinity of the swing fulcrum 85, and thus it is difficult for the user to replace the toner cartridge disposed below the swing fulcrum 85.

SUMMARY OF THE INVENTION

The present disclosure is directed to providing an image forming apparatus that has a structure in which a second rotary shaft that is a rotation center of a cover portion is disposed on a rear side of a first rotary shaft that is a rotation center of a rotating unit.

According to an aspect of the present disclosure, an image forming apparatus includes an apparatus body including an image forming portion configured to form an image on a sheet, a rotating unit disposed above the apparatus body and rotatably supported around a first rotary shaft with respect to the apparatus body, and a cover portion rotatably supported around a second rotary shaft extending in parallel to the first rotary shaft with respect to the apparatus body, the cover portion forming at least a part of an upper surface of the apparatus body in a closed state and causing an inside of the apparatus body to be exposed in an open state. The rotating unit and the cover portion are opened from a front side of the image forming apparatus to a rear side of the image forming apparatus. The second rotary shaft is disposed on the rear side of the first rotary shaft.

Further features of the present disclosure will become apparent from the following description of exemplary embodiments with reference to the attached drawings.

BRIEF DESCRIPTION OF THE DRAWINGS

FIG. 8 is a sectional view illustrating the reading rotating portions.

FIG. 9 is a rear perspective view illustrating cover rotating portions.

FIG. 10 is a sectional view illustrating the cover rotating portions.

DESCRIPTION OF THE EMBODIMENTS

Exemplary embodiments of the present disclosure will be described below with reference to the accompanying drawings. Hereinafter, the term "image forming apparatus" includes a printer, a copying machine, a facsimile, and a multi-function peripheral including these functions. The term "sheet" refers to a sheet material that can be used as a recording medium or a document. Examples of the sheet include paper (e.g., plain paper and thick paper), plastic films (e.g., an overhead projector sheet), specially-shaped sheets (e.g., an envelope and index paper), and cloth.

Figure 1:
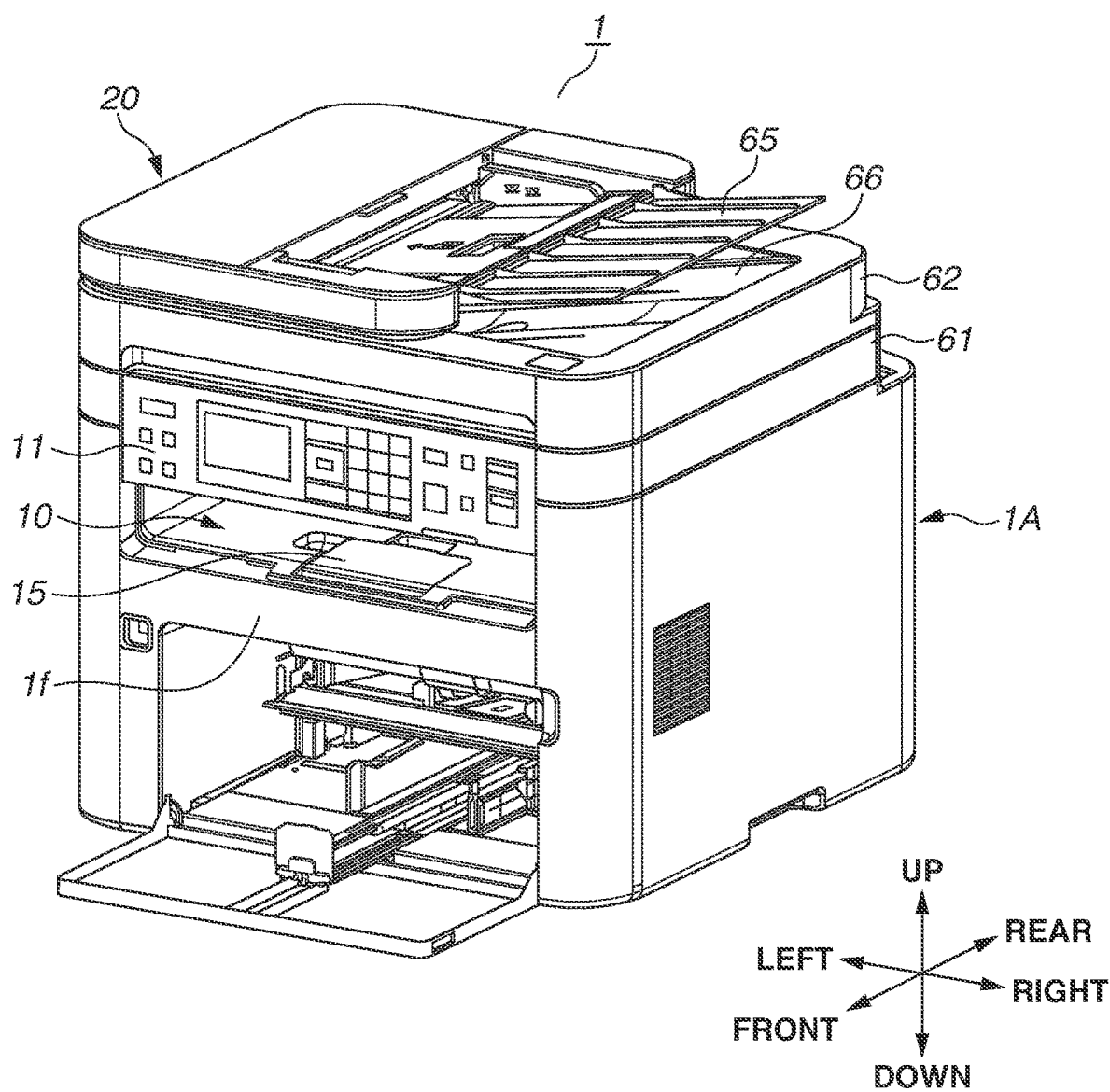
FIG. 1 is a perspective view illustrating an image forming apparatus according to an exemplary embodiment of the present disclosure.
Figure 2:
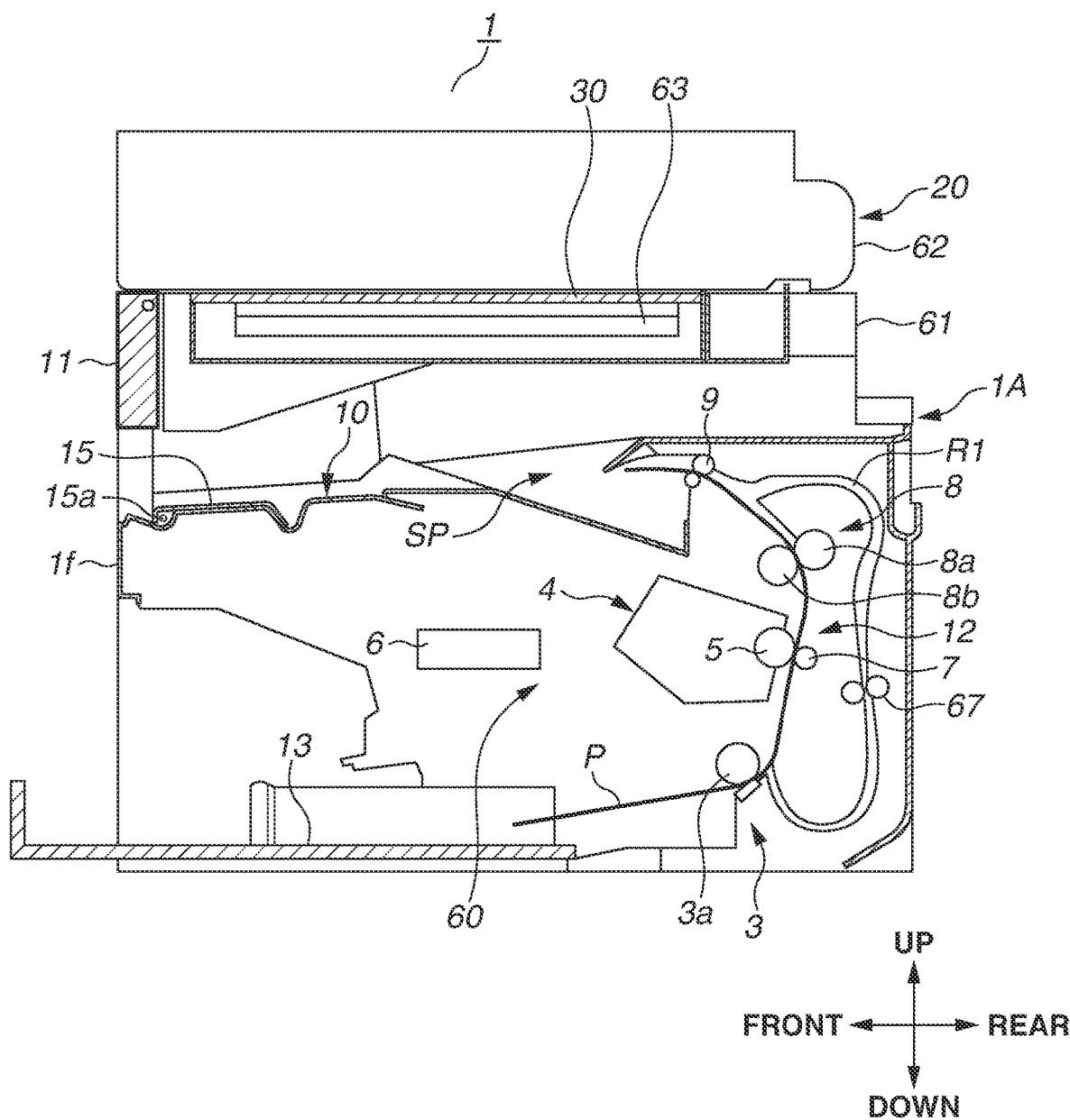
FIG. 2 is a sectional view illustrating the image forming apparatus.

FIG. 1 is a perspective view illustrating an image forming apparatus 1 according to an exemplary embodiment of the present disclosure. FIG. 2 is a sectional view illustrating the image forming apparatus 1. As illustrated in FIGS. 1 and 2, the image forming apparatus 1 mainly includes an image forming apparatus body 1A (hereinafter referred to as an apparatus body) including an image forming function (print function), and an image reading apparatus 20 that reads image information from a document.

The image reading apparatus 20 serving as a rotating unit includes a base portion 61 and an auto document feeder (ADF) 62 that is openable and closable with respect to the base portion 61. The ADF 62 includes a document tray 65 on which documents are placed, a document feeding portion that feeds documents one by one from the document tray 65, and a discharge tray 66 onto which the documents from which image information is read are discharged. The ADF 62 is openable upward in FIG. 1 with respect to the apparatus body 1A.

As illustrated in FIG. 2, the base portion 61 includes a flat platen glass 30 and a reading sensor 63 serving as a reading portion that reads image information from a document placed on the platen glass 30. The base portion 61 is supported by the apparatus body 1A. The reading sensor 63 can also read image information from a document fed by the ADF 62. The reading sensor 63 includes a light source, a photoelectric conversion element, and an optical system that irradiates a document with light from the light source and guides reflected light to the photoelectric conversion element.

As illustrated in FIG. 1, an operation panel 11 that is used for a user to operate the image forming apparatus 1 is provided at a front end of the base portion 61. Hereinafter, the side of the image forming apparatus 1 on which the user who operates the operation panel 11 stands is referred to as "front side" of the image forming apparatus 1, and the opposite side of the front side is referred to as "rear side" of the image forming apparatus 1. Further, a right-hand side when the image forming apparatus 1 is viewed from the front side is referred to as "right side" of the image forming apparatus 1, and the opposite side of the right side is referred to as "left side" of the image forming apparatus 1. Furthermore, "upward" and "downward" of the image forming apparatus 1 are directions in the vertical direction when the image forming apparatus 1 is installed on a flat installation surface.

As illustrated in FIG. 2, the apparatus body 1A includes a sheet feeding apparatus 3, an image forming portion 60 that forms an image on a sheet, and a fixing portion 8. In the sheet feeding apparatus 3, sheets P stacked on a feeding tray 13 are fed one by one by a feeding roller 3a. The image forming portion 60 includes a process cartridge 4, which is a cartridge, and a laser scanner 6. The image forming portion 60 forms a toner image by executing an electrophotographic process based on image information transmitted from the image reading apparatus 20 or an external computer. Specifically, a photosensitive drum 5, which is a photosensitive body, is charged and exposed to light by the laser scanner 6 based on the image information to form an electrostatic latent image on the surface of the photosensitive drum 5, and then the electrostatic latent image is developed into a toner image.

The toner image carried on the photosensitive drum 5 is transferred onto the sheet P by a transfer portion 12, which includes the photosensitive drum 5 and a transfer roller 7, and the toner image is fixed onto the sheet P in the fixing portion 8. The fixing portion 8 includes a fixing film 8b that heats the sheet P, and a pressure roller 8a that brings the sheet P into pressure contact with the fixing film 8b. The fixing portion 8 applies heat and pressure to the toner image transferred onto the sheet P. As a result, the toner is melted and then fixed onto the sheet P, so that the image fixed onto the sheet P is obtained.

When an image formation request is sent to the image forming apparatus 1, the sheet P accommodated in the feeding tray 13 is fed by the feeding roller 3a at a predetermined timing that matches the operation of the process cartridge 4. The sheet P onto which the toner image is transferred by the transfer portion 12 and the image is fixed by the fixing portion 8 is discharged from the apparatus body 1A by discharge rollers 9, and is stacked on a discharge stacking portion 10. In the case of performing double-sided printing, the discharge rollers 9 are reversely rotated after the sheet P is conveyed by a predetermined distance, and then the sheet P passes through a double-sided conveyance path R1 and is fed to a double-sided conveyance portion 67. After that, the sheet P on which an image has been formed on the other surface thereof reaches the discharge rollers 9 again and is discharged onto the discharge stacking portion 10.

The discharge stacking portion 10 is disposed below the base portion 61 of the image reading apparatus 20, and is arranged at a position overlapping the base portion 61 as viewed from above. In other words, in the present exemplary embodiment, the sheet P discharged by the discharge rollers 9 is discharged into a discharge space SP that is formed between the apparatus body 1A and the image reading apparatus 20.

As illustrated in FIGS. 1 and 2, the sheet P on which an image has been formed in the apparatus body 1A is discharged toward the front side of the apparatus body 1A from the rear side of the apparatus body 1A by the discharge rollers 9 serving as a discharge portion. On the discharge stacking portion 10, an extension tray 15 is supported so as to be openable and closable around a rotary shaft 15a. When the extension tray 15 is opened, a longer sheet can be stacked on the discharge stacking portion 10.

Figure 3:
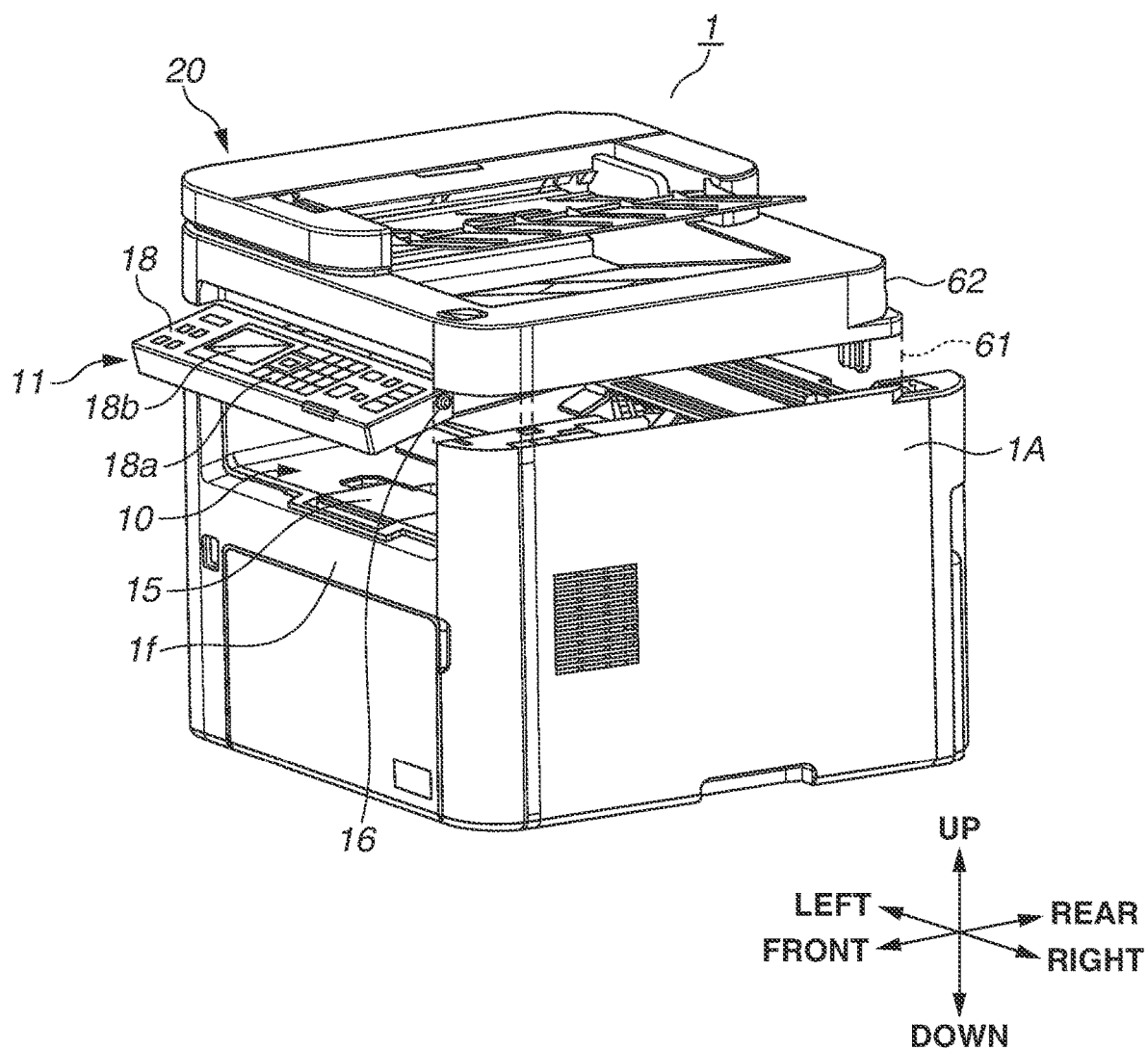
FIG. 3 is a perspective view illustrating an operation panel.

As illustrated in FIG. 3, the operation panel 11 is coupled to a bearing, which is provided on the base portion 61 via a swing support portion 16, and rotates with the swing support portion 16 as a rotation fulcrum. In FIG. 3, the illustration of the base portion 61 is omitted. The rotation axis direction of the swing support portion 16 corresponds to the left-right direction of the image forming apparatus 1, like the rotation axis of the rotary shaft 15a (see FIG. 2) of the extension tray 15.

Figure 4A:
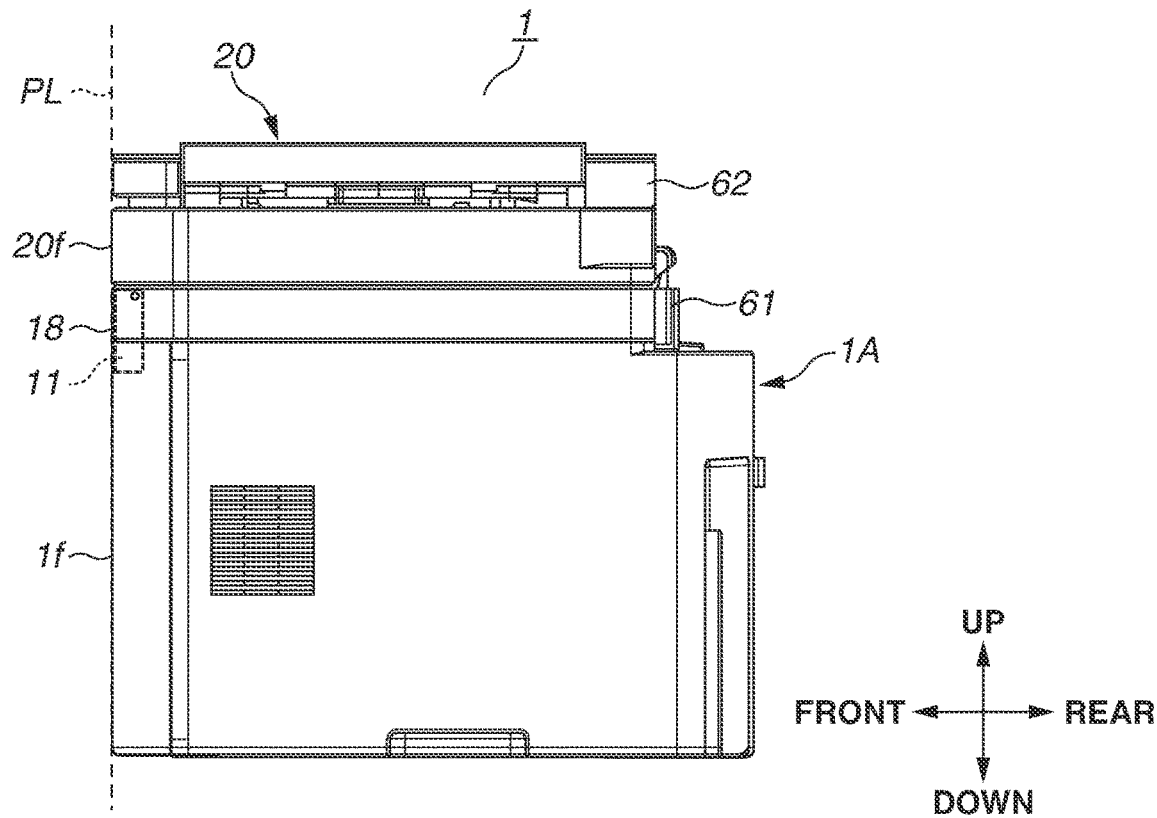
FIG. 4A is a side view illustrating the image forming apparatus in a state where the operation panel is closed.
Figure 4B:
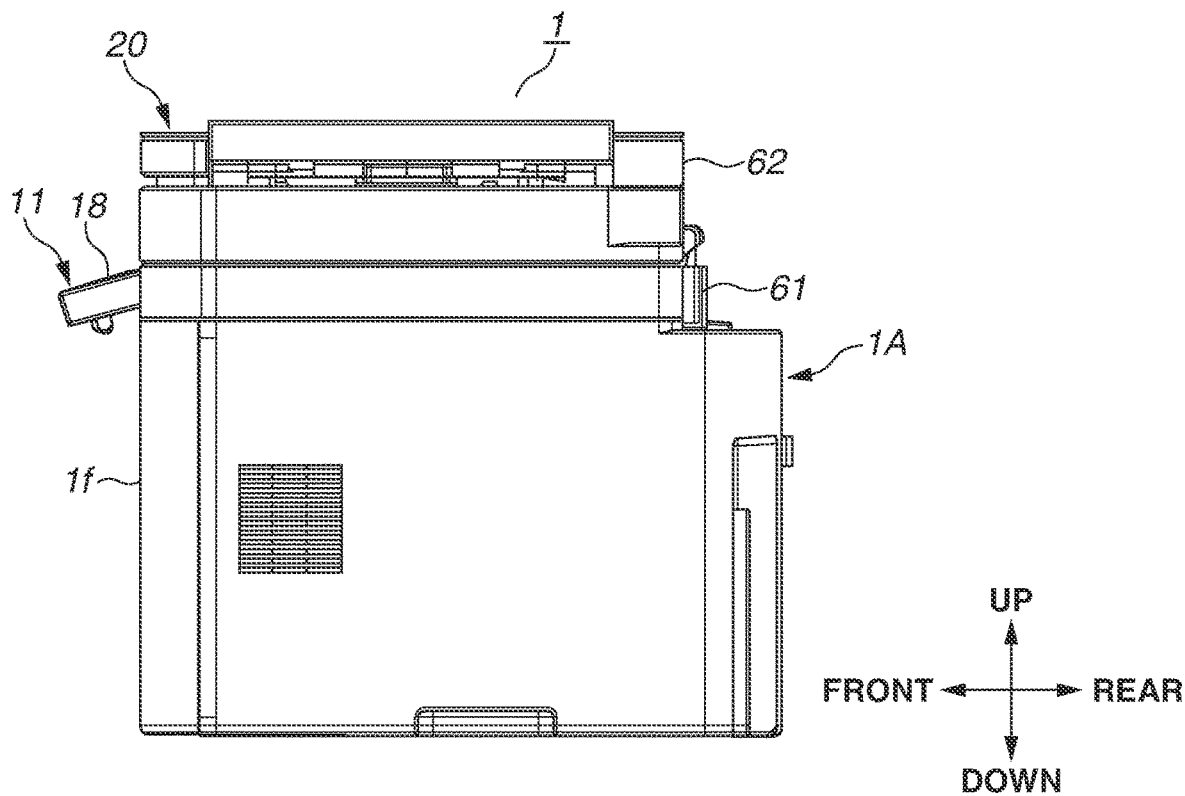
FIG. 4B is a side view illustrating the image forming apparatus in a state where the operation panel is opened.

The operation panel 11 can be tilted at any angle between the positions illustrated in FIGS. 4A and 4B depending on the height of a user's view point (tilt operation). FIG. 4A illustrates a state where the operation panel 11 is closed. In this state, the operation panel 11 has such a posture that the operation panel 11 extends in the vertical direction along a side surface (i.e., a front surface 1f) on a downstream side of the apparatus body 1A in a sheet discharge direction. The front surface of the operation panel 11 and the front surface 1f form the substantially same surface. Specifically, a front surface 20f of the image reading apparatus 20, including the front surface of the operation panel 11, and the front surface 1f of the apparatus body 1A are disposed on the same plane PL. FIG. 4B illustrates a state where the operation panel 11 is opened. In this case, the operation panel 11 projects toward the front side (a first direction) with respect to the front surface 1f of the apparatus body 1A.

As illustrated in FIG. 3, the front surface portion of the operation panel 11 is configured as an operation surface 18 including a plurality of operation keys 18a and a display 18b. The user checks the current operation state and setting information of the image forming apparatus 1 from contents displayed on the display 18b, and performs an operation of inputting a command to the image forming apparatus 1 by operating the operation keys 18a. Examples of the command for the image forming apparatus 1 include a command for instructing the image reading apparatus 20 to read image information and execute a copy job for forming an image on a sheet, and a command for changing image formation conditions (e.g., whether double-sided printing is set).

[Opening/Closing Structure of Each of Image Reading Apparatus and Upper Cover]

Figure 5:
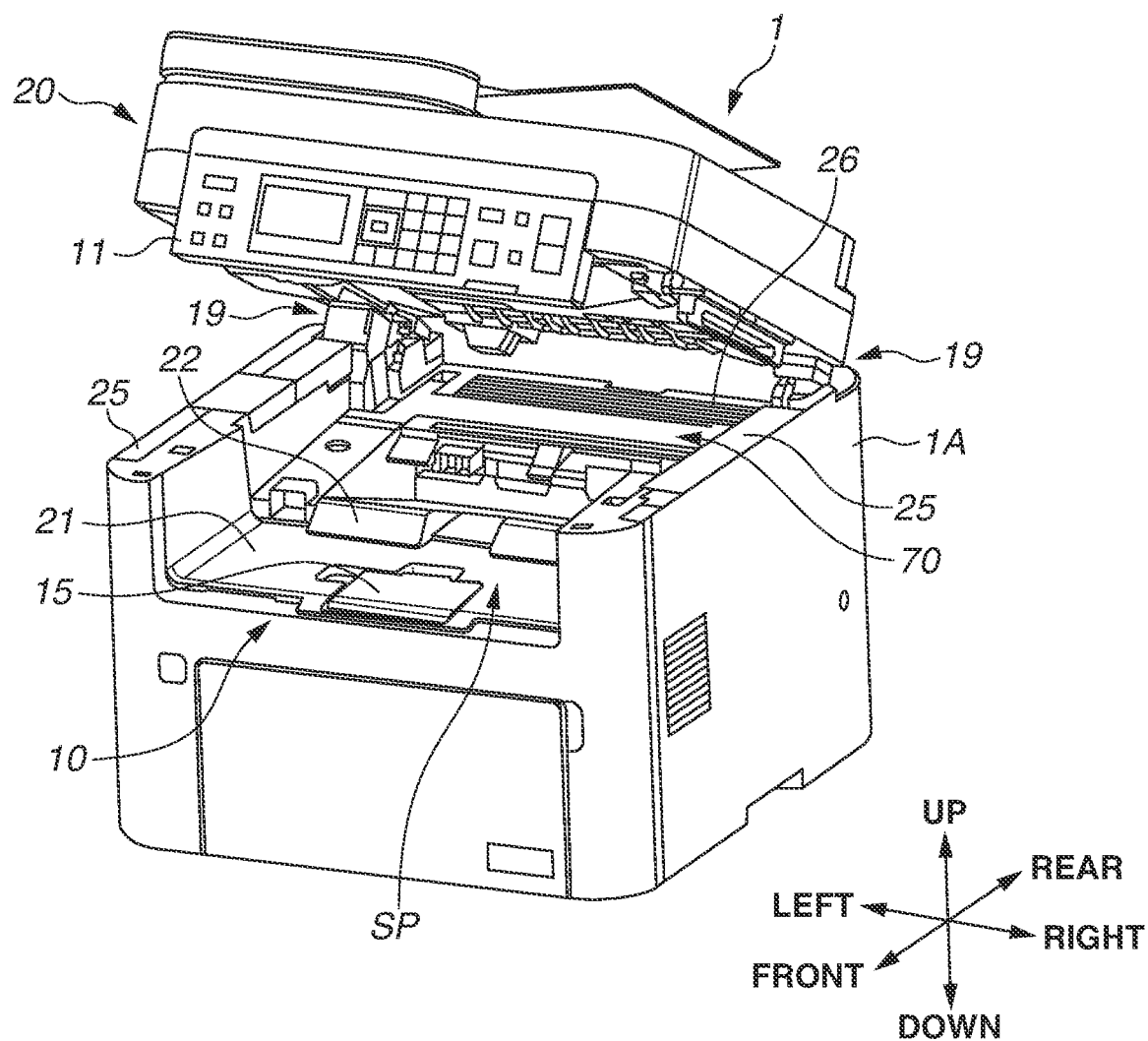
FIG. 5 is a perspective view illustrating the image forming apparatus in a state where an image reading apparatus is opened.

Next, the opening/closing structure of each of the image reading apparatus 20 and an upper cover 22 to be described below will be described. As illustrated in FIG. 5, the image reading apparatus 20 is rotatably coupled to the apparatus body 1A at reading rotating portions 19. The reading rotating portions 19 are provided on the right and left sides at the rear end of the image reading apparatus 20. The apparatus body 1A includes reading support portions 25 on the right and left sides of the discharge stacking portion 10. The reading support portions 25 are formed to be higher than the discharge stacking portion 10. The image reading apparatus 20 is supported by the reading support portions 25 of the apparatus body 1A when the image reading apparatus 20 is closed.

Figure 6:
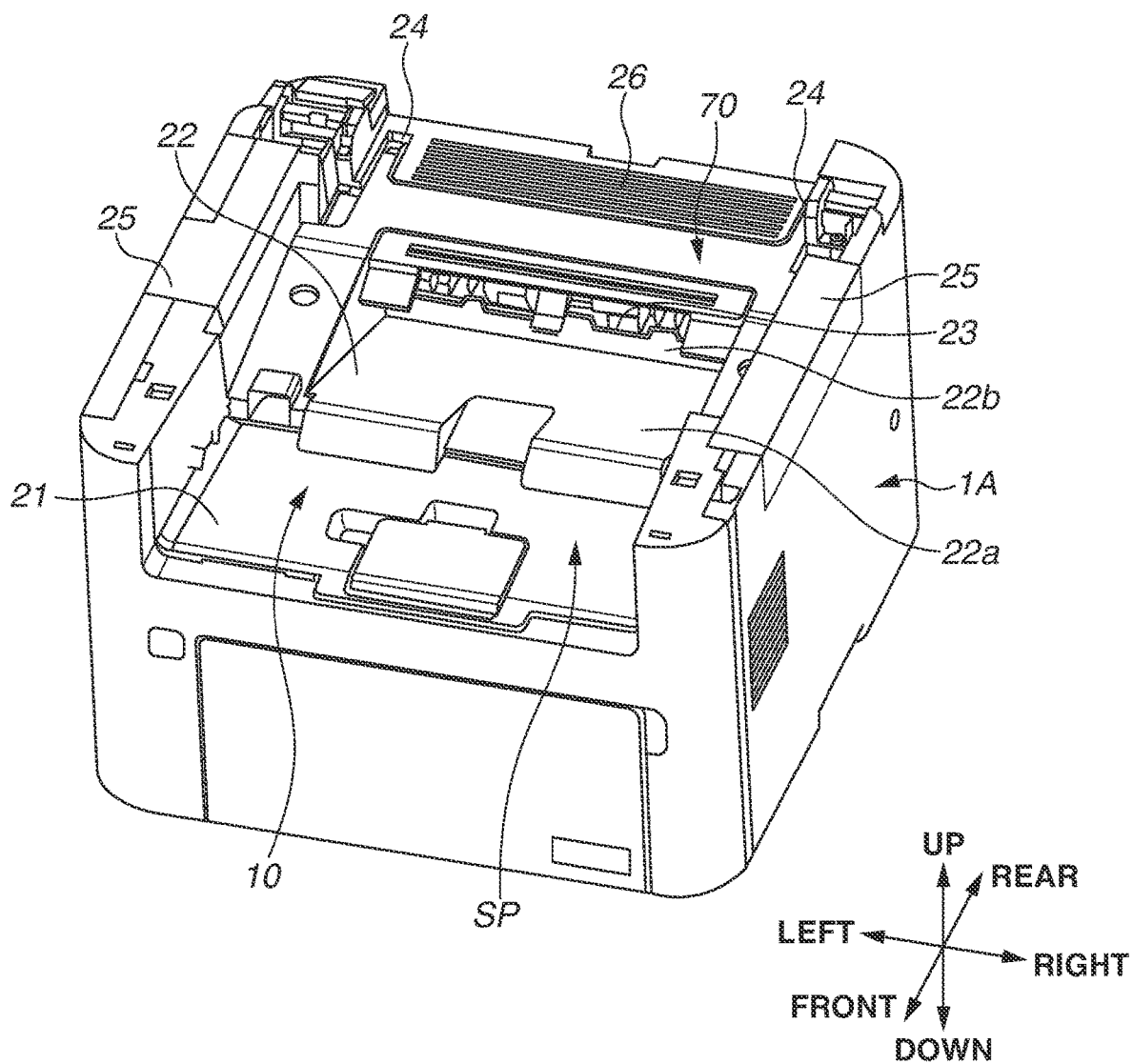
FIG. 6 is a perspective view illustrating an upper cover.

As illustrated in FIGS. 5 and 6, the discharge space SP is a space surrounded by the reading support portions 25 and the discharge stacking portion 10. The discharge stacking portion 10 includes a body top cover 21, which is fixed as a housing of the apparatus body 1A, and the upper cover 22. The upper cover 22 is rotatably coupled to the apparatus body 1A at cover rotating portions 24. The upper cover 22 includes a discharge port 23 through which a sheet is discharged, a support surface 22a on which the discharged sheet is supported, and a contact surface 22b which extends upward from a rear end of the support surface 22a.

The support surface 22a is tilted downward toward the rear side in a closed state in which the upper cover 22 is closed with respect to the apparatus body 1A. Each sheet P supported on the support surface 22a slides along the support surface 22a toward the contact surface 22b. A trailing edge of each sheet P comes into contact with the contact surface 22b, so that the trailing edges of the sheets P discharged onto the discharge stacking portion 10 are aligned.

The upper cover 22 serving as a cover portion constitutes a part of a top surface 70 of the apparatus body 1A in the closed state. The top surface 70 is formed by the upper surfaces of the body top cover 21, the upper cover 22, the reading support portions 25, and the like. When the upper cover 22 is in an open state, the inside of the apparatus body 1A is exposed, so that the process cartridge 4 and other components can be detached therefrom. In the body top cover 21, an exhaust port 26 is formed between reading rotating portions 19 in the left-right direction, and the inside of the apparatus body 1A and an external space (outside air) communicate with each other through the exhaust port 26.

Figure 7:
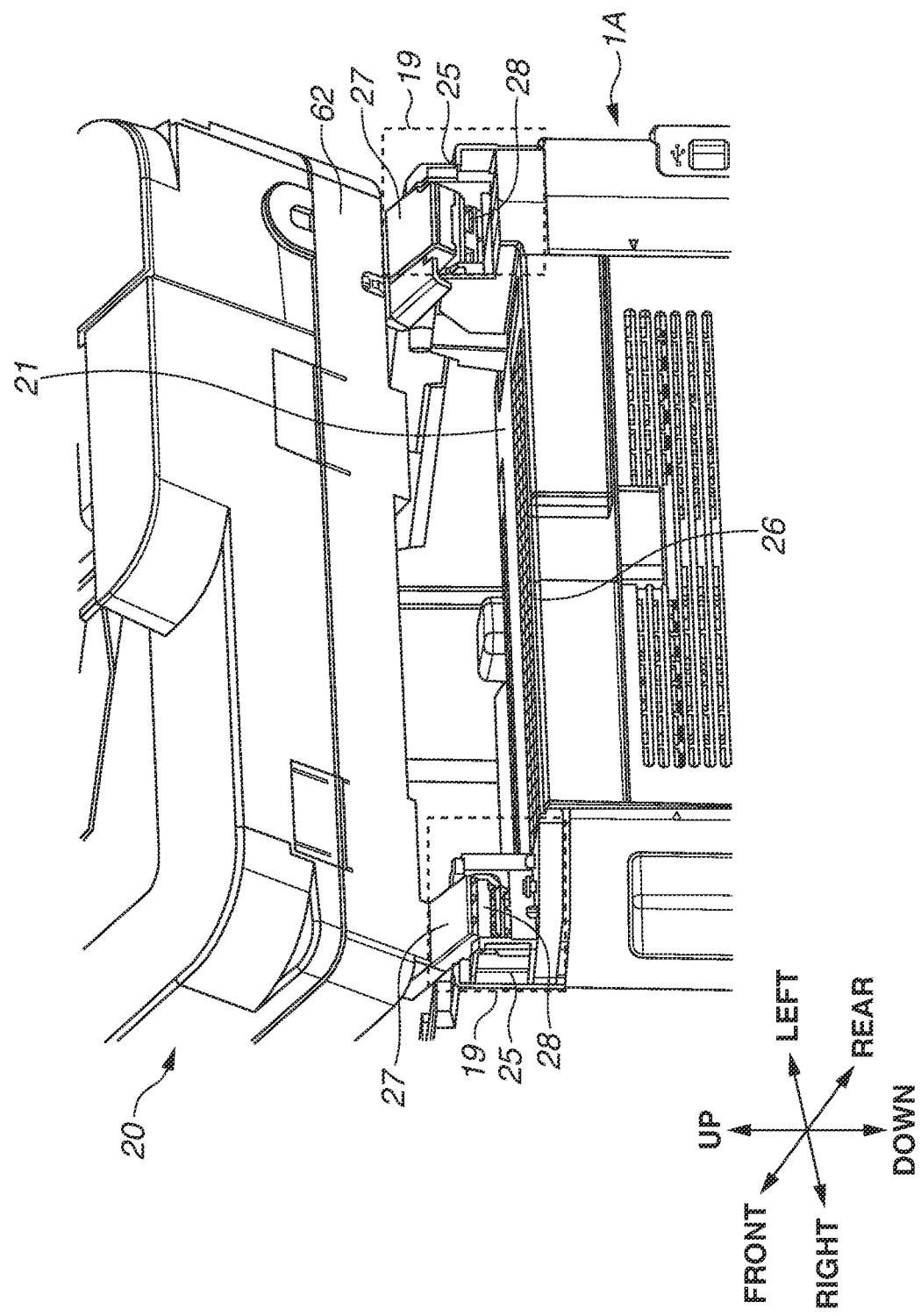
FIG. 7 is a rear perspective view illustrating reading rotating portions.

As illustrated in FIGS. 7 and 8, each reading rotating portion 19 includes a bearing portion 27, which is provided on the base portion 61 of the image reading apparatus 20, and a reading rotary shaft 28 which is provided on the corresponding reading support portion 25 of the apparatus body 1A. The reading rotary shaft 28 serving as a first rotary shaft engages with the bearing portion 27 and is rotatably supported by the bearing portion 27. In other words, the base portion 61 is supported so as to be opened and closed around the reading rotary shaft 28 with respect to the apparatus body 1A.

Further, as illustrated in FIGS. 9 and 10, each cover rotating portion 24 includes a bearing portion 29, which is provided at a rear end of the upper cover 22, and a cover shaft 31 which is provided on the body top cover 21 of the apparatus body 1A. The cover shaft 31 (a second rotary shaft) engages with the bearing portion 29 and is rotatably supported by the bearing portion 29. The reading rotary shaft 28 and the cover shaft 31 extend in parallel to each other in the left-right direction, but instead may be provided in such a manner that, for example, the reading rotary shaft 28 and the cover shaft 31 intersect with each other within a range of ±5 degrees. Further, the image reading apparatus 20 and the upper cover 22 are opened to the rear side from the front side.

As illustrated in FIG. 8, the reading rotary shaft 28 and the cover shaft 31 are disposed between a rear surface 33 of the apparatus body 1A and a rear surface 32 of the image reading apparatus 20 in the front-rear direction. The reading rotary shaft 28 is disposed between the body top cover 21 and a bottom surface 34 of the image reading apparatus 20 in the up-down direction. Each of the rear surfaces 32 and 33 refers to an endmost surface which does not include a cable for electrically connecting the image reading apparatus 20 to the apparatus body 1A, and also does not include a swing unit for pressing a document placed on a document platen glass from above.

Figure 11:
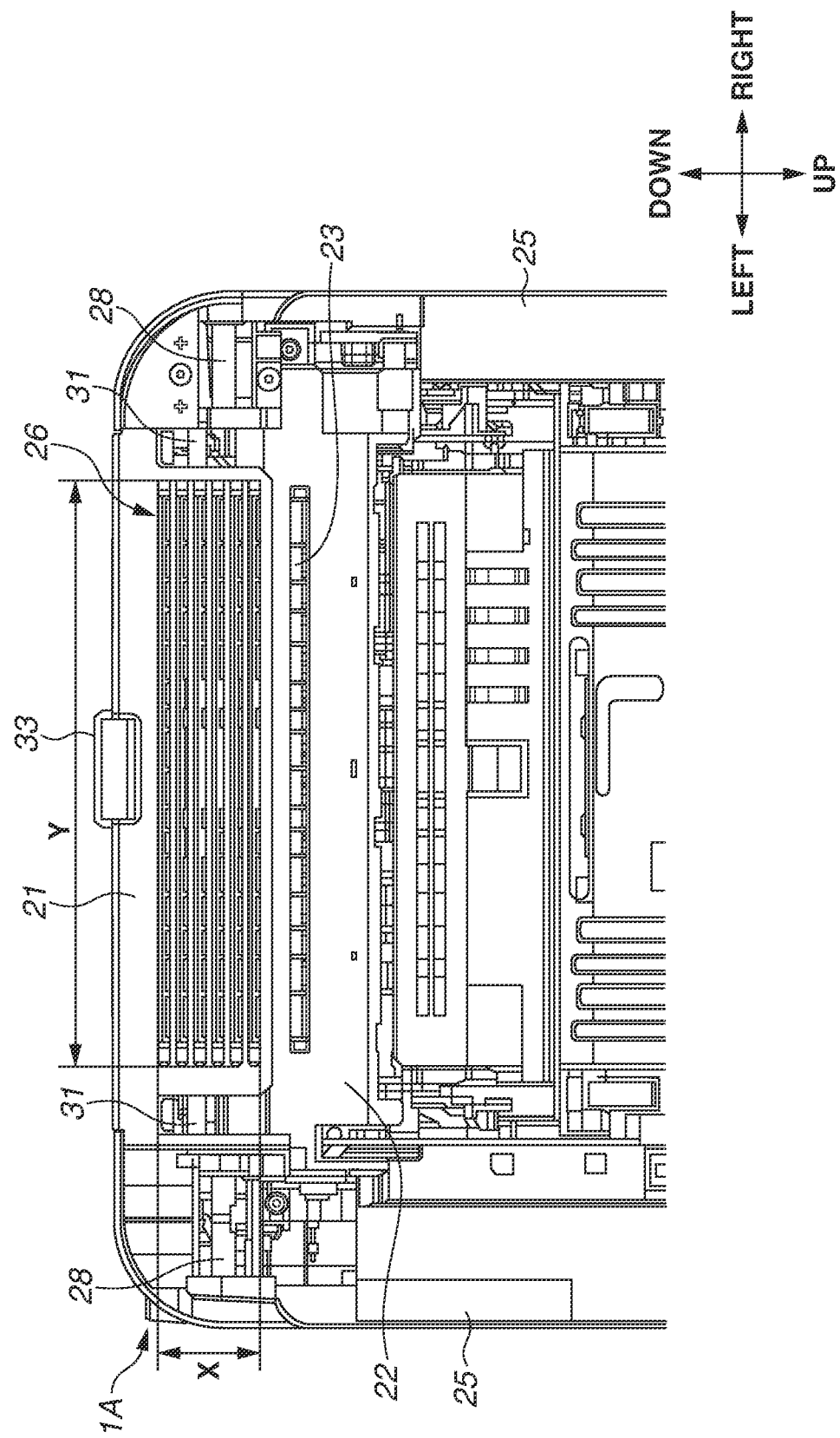
FIG. 11 is a plan view illustrating an arrangement of a reading rotary shaft and a cover shaft.

As illustrated in FIG. 11, the cover shaft 31 is disposed between the reading rotary shaft 28 and the discharge port 23 in the left-right direction, and is disposed between the reading rotary shaft 28 and the rear surface 33 of the apparatus body 1A in the front-rear direction. In other words, the cover shaft 31 is disposed at a position that is on the inside of the apparatus with respect to the reading rotary shaft 28 in the axial direction of the cover shaft 31 and is on the rear side of the reading rotary shaft 28.

Figure 12A:
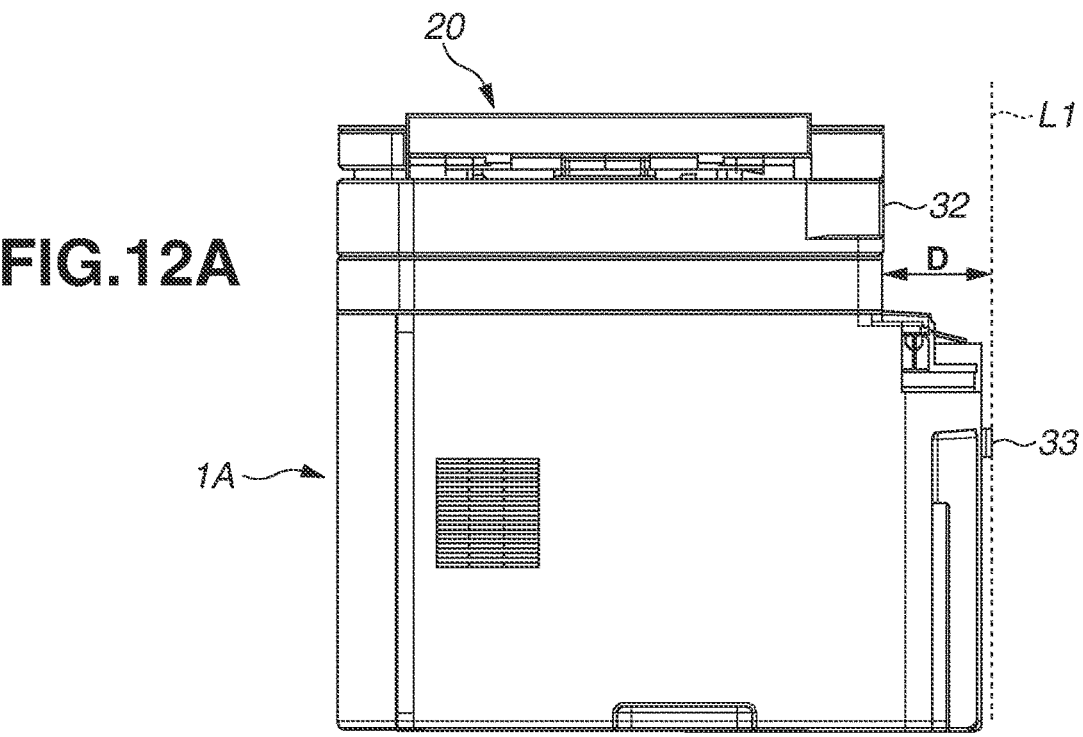
FIG. 12A is a side view illustrating the image forming apparatus in a state where the image reading apparatus is closed.
Figure 12B:
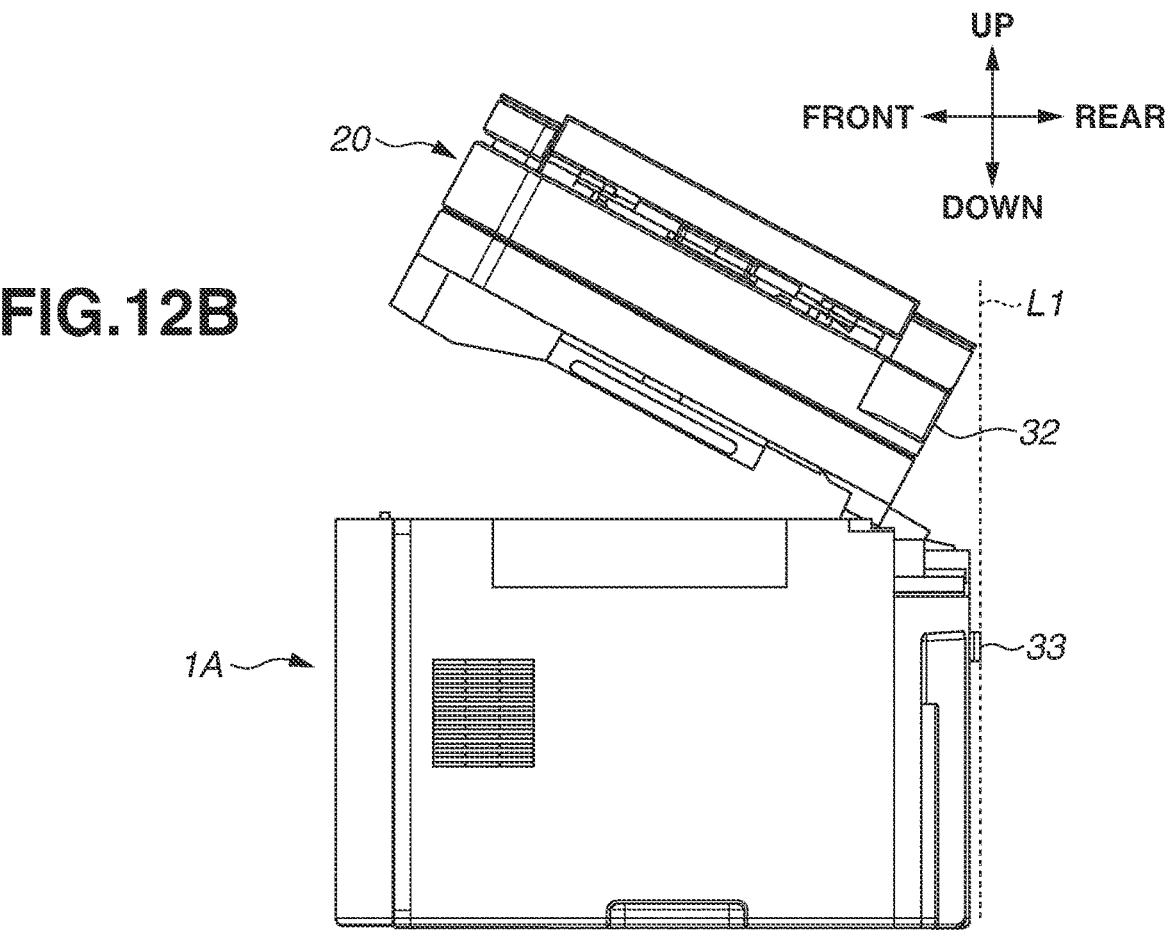
FIG. 12B is a side view illustrating the image forming apparatus in a state where the image forming apparatus is opened.

On the other hand, as illustrated in FIG. 12A, when the image reading apparatus 20 is closed with respect to the apparatus body 1A, the rear surface 32 of the image reading apparatus 20 is disposed at a position that is closer to the front side by a distance D than the rear surface 33 of the apparatus body 1A is. Thus, when the image reading apparatus 20 is opened, the rear portion of the image reading apparatus 20 is less likely to project toward the rear side of the rear surface 33 of the apparatus body 1A. For example, as illustrated in FIG. 12B, the image reading apparatus 20 can be fully opened without projecting toward the rear side of a plane L1 along the rear surface 33 of the apparatus body 1A. Consequently, even when the image forming apparatus 1 is installed at a position close to a wall, the image reading apparatus 20 can be fully opened without interfering with the wall, which enables the user to easily replace a component, such as the process cartridge 4, in the apparatus body 1A.

As long as the rear surface 32 is disposed on the front side of the rear surface 33, the rear portion of the image reading apparatus 20 may project toward the rear side of the rear surface 33 of the apparatus body 1A when the image reading apparatus 20 is fully opened. Also, in this case, the amount of projection of the rear portion of the image reading apparatus 20 toward the rear side of the rear surface 33 can be reduced as compared with a case where the rear surface 32 is flush with the rear surface 33 or is disposed on the rear side of the rear surface 33.

[Exhaust Port]

Figure 13:
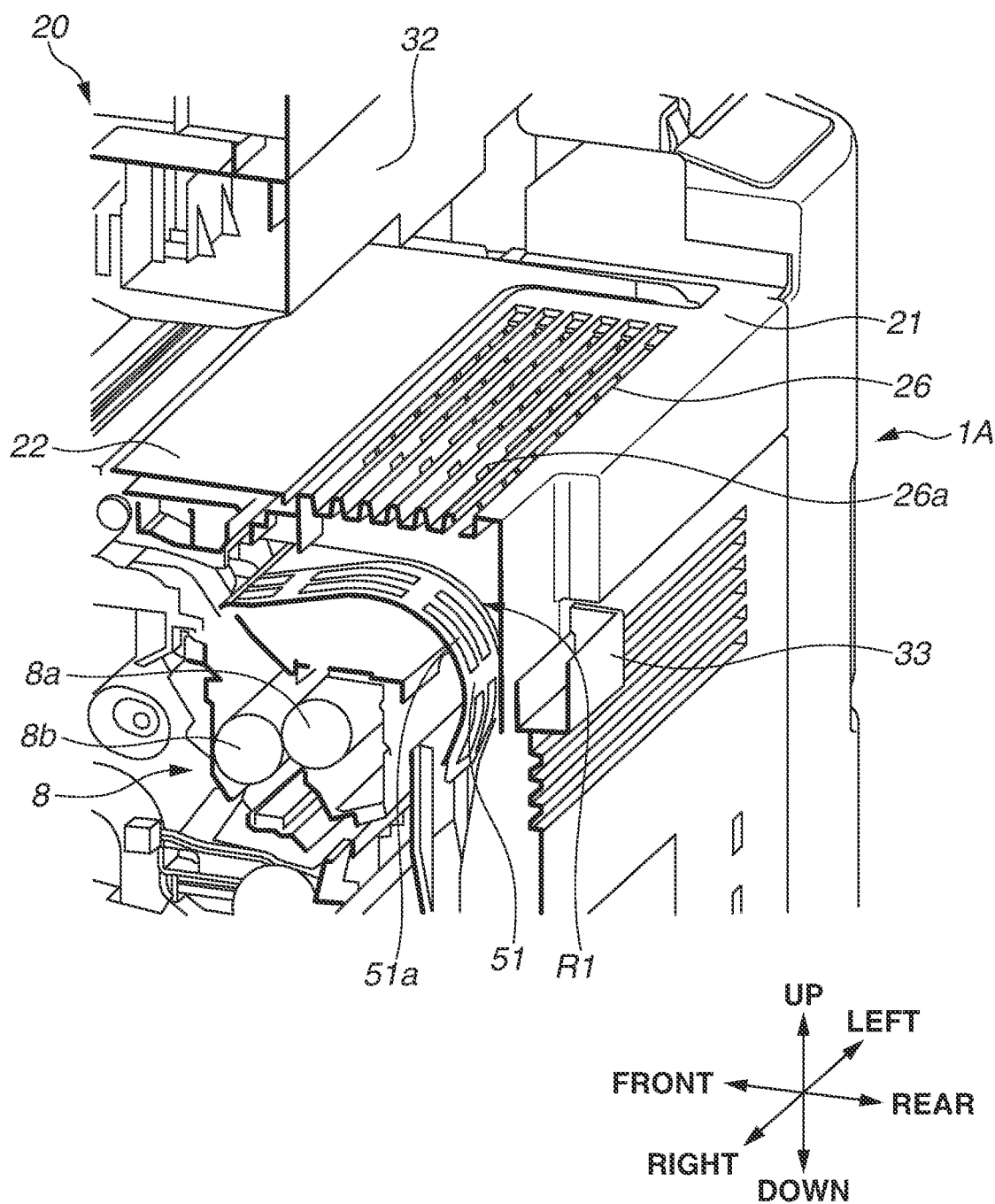
FIG. 13 is a perspective view illustrating an exhaust port.
Figure 14:
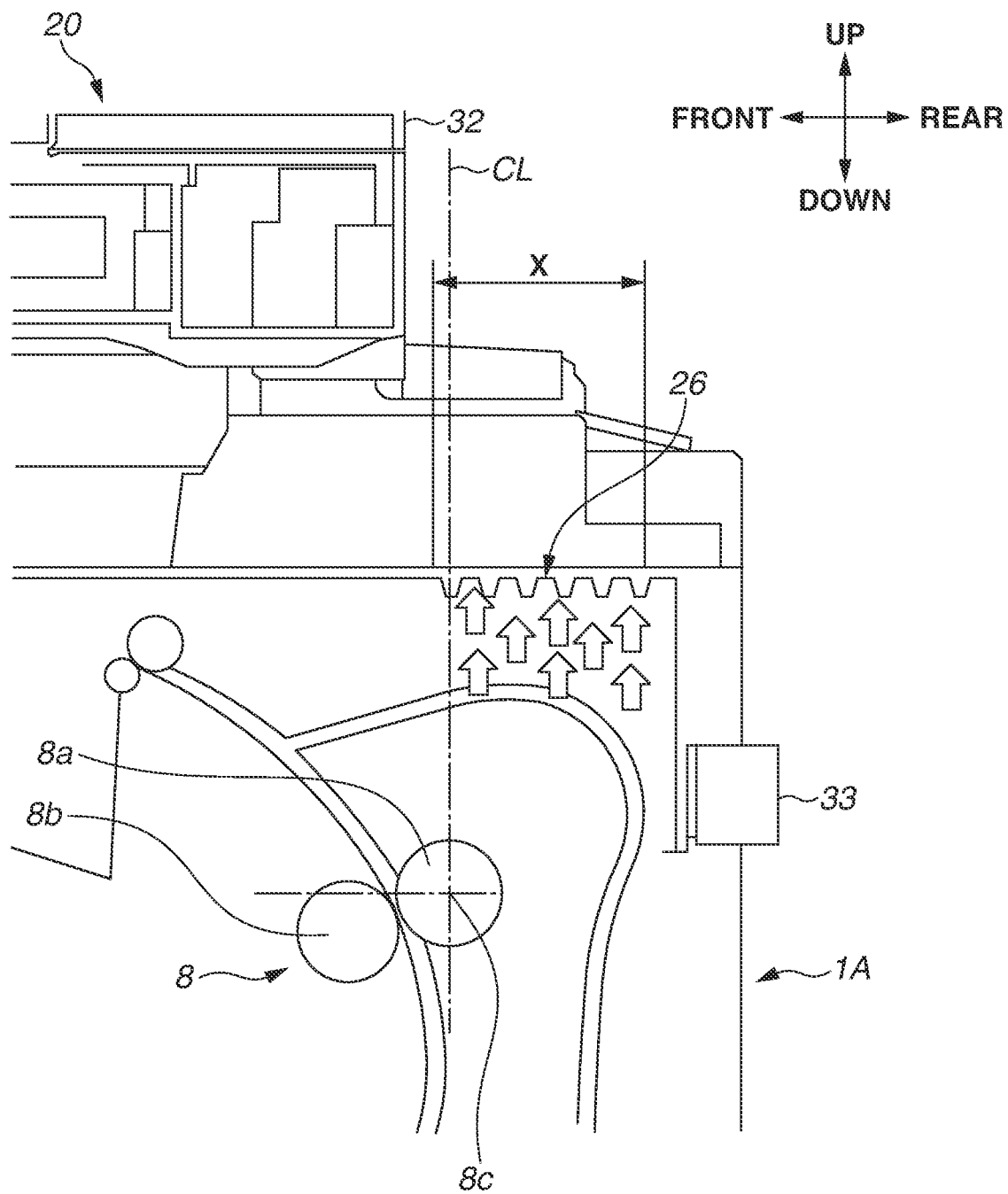
FIG. 14 is a sectional view illustrating the exhaust port and a fixing portion.

Next, the exhaust port 26 will be described in detail. As illustrated in FIGS. 13 and 14, the exhaust port 26 including a plurality of holes 26a, which are opened upward, is formed in the rear portion of the upper cover 22. A double-sided conveyance guide 51 which forms the double-sided conveyance path R1 is provided with a plurality of holes 51a. The fixing portion 8 is disposed below the upper cover 22 and the double-sided conveyance guide 51. Hot air heated by the fixing portion 8 ascends in the apparatus body 1A. The ascending hot air is discharged to the outside of the apparatus by natural convection through the plurality of holes 51a of the double-sided conveyance guide 51 and the exhaust port 26.

As illustrated in FIG. 14, the exhaust port 26 is disposed in such a manner that a straight line CL which passes through at least a shaft center 8c of the pressure roller 8a of the fixing portion 8 and extends in the up-down direction passes within an opening width X in the front-rear direction of the exhaust port 26. The exhaust port 26 is disposed between the rear surface 32 of the image reading apparatus 20 and the rear surface 33 of the apparatus body 1A in the front-rear direction. Further, an opening width Y (see FIG. 11) in the left-right direction of the exhaust port 26 is set to be substantially equal to the width in the left-right direction of the pressure roller 8a.

Thus, the hot air heated by the fixing portion 8 ascends in the apparatus body 1A by natural convection and is effectively discharged from the exhaust port 26. This makes it possible to appropriately cool the inside of the apparatus body 1A and reduce damages to components and printing failures. Further, since the rear surface 32 of the image reading apparatus 20 is disposed on the front side of the exhaust port 26, the upper portion of the exhaust port 26 is open, which makes it possible to reduce dew condensation in the image reading apparatus 20. In particular, it is possible to reduce dew condensation in the photoelectric conversion element, a lens, or the like of the reading sensor 63 of the image reading apparatus 20, thereby reducing reading failures.

Figure 15:
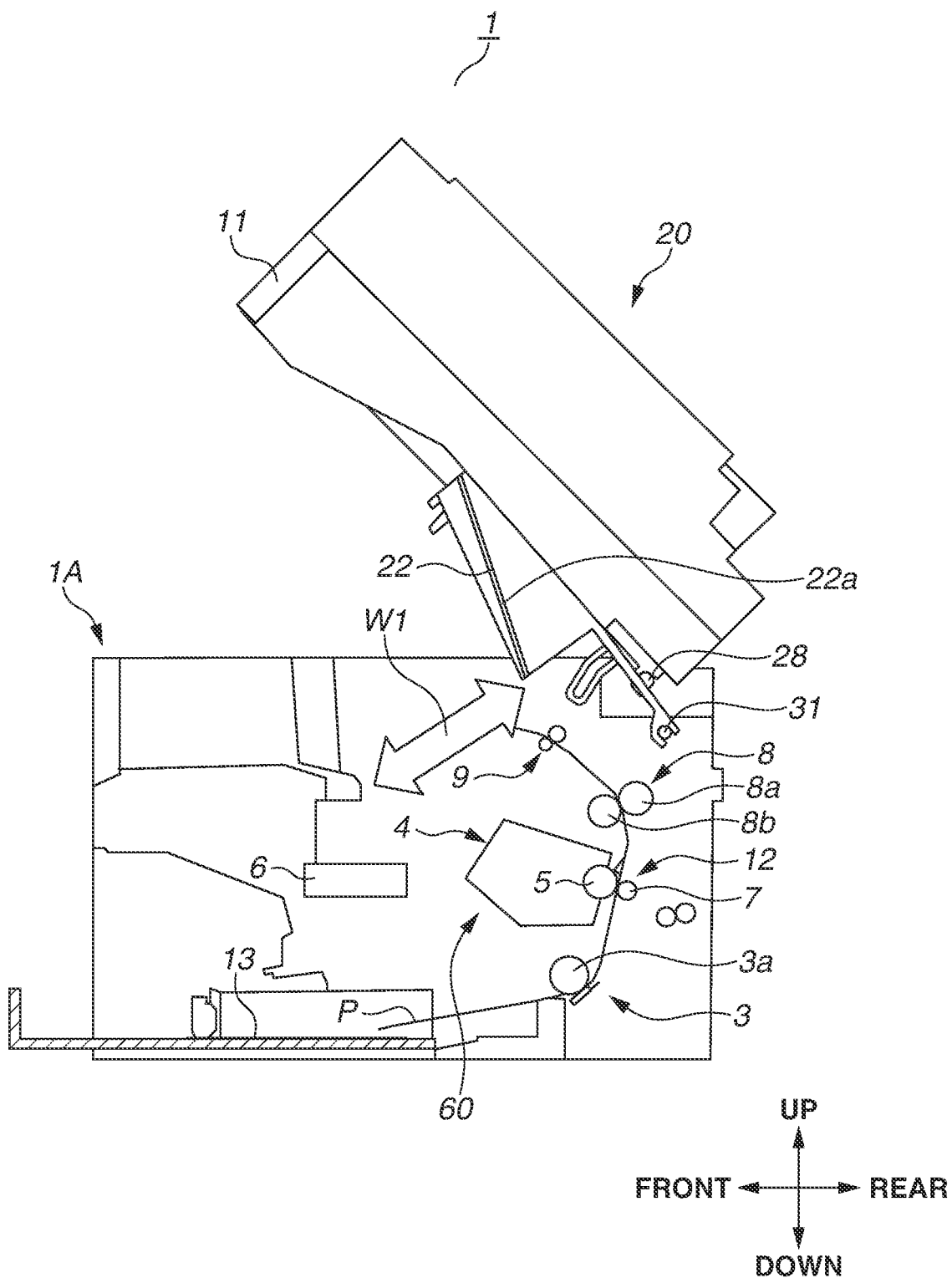
FIG. 15 is a sectional view illustrating a work area according to an exemplary embodiment.
Figure 16:
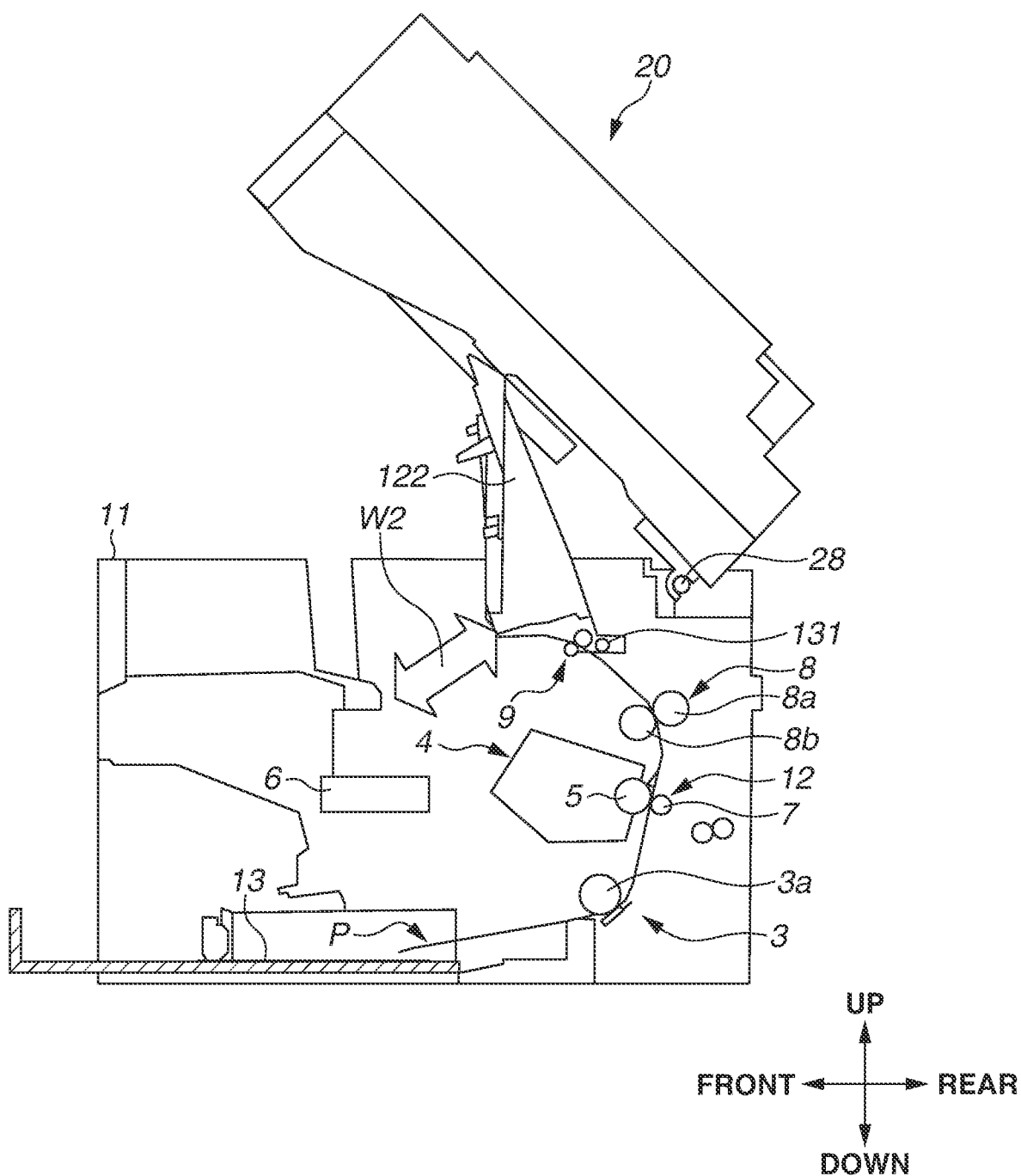
FIG. 16 is a sectional view illustrating a work area according to a comparative example.
Figure 17:
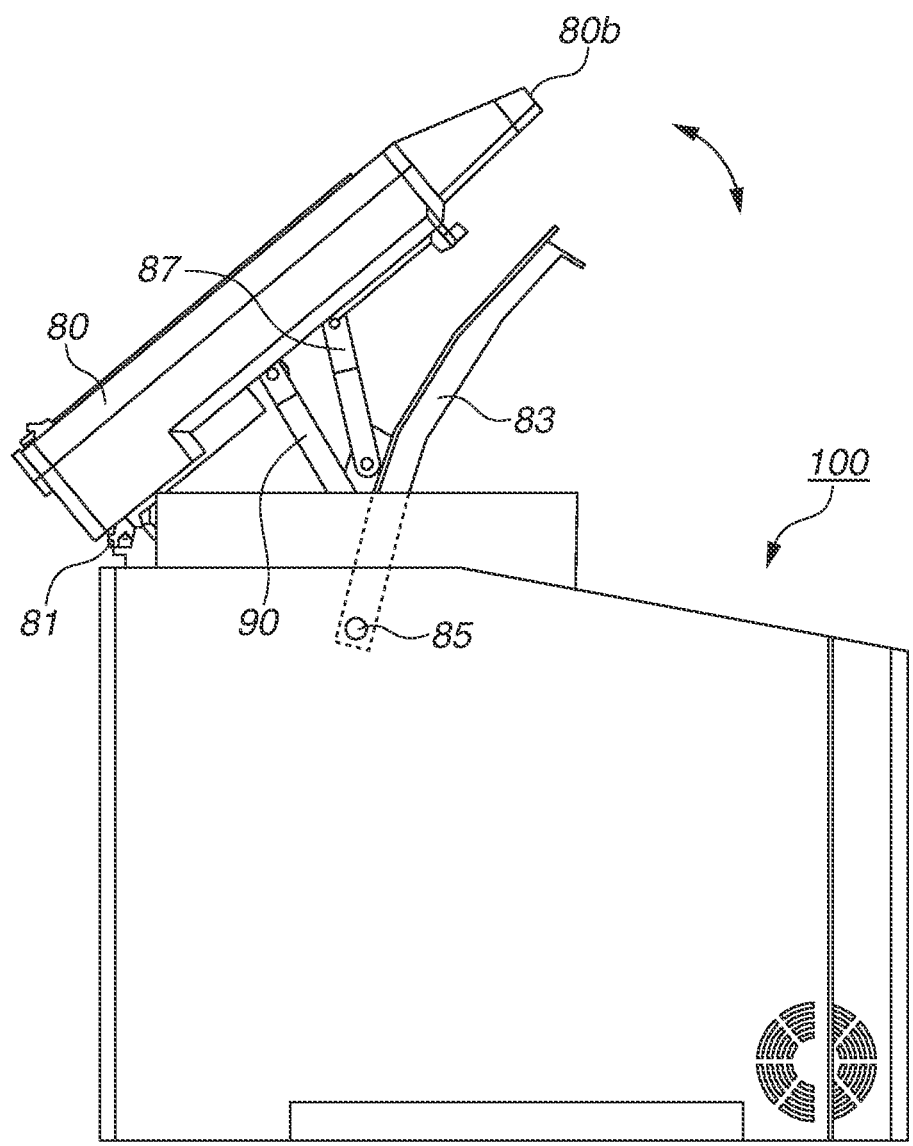
FIG. 17 is a side view illustrating a multi-function peripheral of related art.

As described above, in the present exemplary embodiment, since the cover shaft 31 is disposed on the rear side of the reading rotary shaft 28, as illustrated in FIG. 15, when the upper cover 22 is in the open state, a work space W1 for replacing the process cartridge 4 or the like appears. Specifically, the work space W1 is an opening formed between the apparatus body 1A and the upper cover 22 in the open state. FIG. 16 illustrates a comparative example in which a cover shaft 131 is disposed on the front side of the reading rotary shaft 28 in contrast. When an upper cover 122 according to the comparative example is in the open state, a work space W2 appears.

When the work space W2 is compared with the work space W1, the work space W1 is larger than the work space W2. In the present exemplary embodiment, the work space W1 is about 1.6 times larger than the work space W2. Accordingly, the inside space of the apparatus body 1A is more widely exposed in the present exemplary embodiment than the comparative example. Therefore, the process cartridge 4 and other components provided in the apparatus body 1A can be easily replaced, which leads to an improvement in maintainability. Examples of other components include a toner cartridge and a development cartridge in a case where the process cartridge and the toner cartridge or the development cartridge are formed separately.

Further, as described above, the upper cover 22 includes the support surface 22a that is tilted downward toward the rear side when the upper cover 22 is in the closed state. When the upper cover 22 is in the open state, the support surface 22a acts in the direction in which the work space is narrowed. However, when the cover shaft 31 is disposed on the rear side of the reading rotary shaft 28 as in the present exemplary embodiment, a sufficient work space can be secured without changing the size of the image forming apparatus 1.

Further, when the operation panel 11 is closed, the front surface 20f of the image reading apparatus 20 is substantially flush with the front surface 1f of the apparatus body 1A. This makes it possible to improve the design of the apparatus while achieving the miniaturization of the apparatus. Furthermore, since the operation panel 11 is configured to be rotatable, the operability of the operation panel 11 can be enhanced and the work space W1 can be prevented from being narrowed when the image reading apparatus 20 and the upper cover 22 are opened to replace the process cartridge 4.

In the present exemplary embodiment, an example is illustrated in which the reading rotary shaft 28 is provided in the apparatus body 1A and the bearing portion 27 is provided in the base portion 61 of the image reading apparatus 20. However, the present disclosure is not limited to this example. The reading rotary shaft 28 may be provided in the base portion 61 and the bearing portion 27 may be provided in the apparatus body 1A. Also, an example is illustrated in which the cover shaft 31 is provided on the body top cover 21 of the apparatus body 1A and the bearing portion 29 is provided on the upper cover 22 in the present exemplary embodiment. However, the present disclosure is not limited to this example. The cover shaft 31 may be provided on the upper cover 22 and the bearing portion 29 may be provided on the body top cover 21.

In the present exemplary embodiment, the image reading apparatus 20 is disposed above the apparatus body 1A. However, the present disclosure is not limited there. Another apparatus such as a facsimile, may be disposed above the apparatus body 1A. Furthermore, in the present exemplary embodiment, the ADF 62 is disposed above the base portion 61. Alternatively, a pressing plate for pressing a document placed on the document platen glass from above to position the document may be provided instead of the ADF 62.

The exemplary embodiments have been described above by taking an electrophotographic printer as an example. However, the present disclosure is not limited to this example. For example, the present disclosure is also applicable to an inkjet image forming apparatus that forms an image on a sheet by discharging ink droplets from nozzles.

According to the present exemplary embodiment, since the second rotary shaft is disposed on the rear side of the first rotary shaft, the inside space of the apparatus body can be widely exposed when the cover portion is in the open state. Consequently, it is possible for the user to easily replace a component, such as a cartridge, provided in the apparatus body, which leads to an improvement in maintainability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-099854, filed May 24, 2018, which is hereby incorporated by reference herein in its entirety.

What is claimed is:
1. An image forming apparatus comprising:
an image forming unit having a front side and a back side and including a stacking tray on which a sheet is to be stacked, a conveying roller configured to convey the sheet stacked on the stacking tray, a fixing unit configured to fix a toner image by heat on the sheet conveyed by the conveying roller, a discharging roller configured to discharge the sheet on which the image has formed by the image forming unit, wherein the sheet is discharged in a first direction and the first direction is from the back side of the image forming unit to the front side of the image forming unit, by the discharging roller;

a discharging tray on which the sheet discharged by the discharging roller is stacked, wherein the discharging tray is supported by the image forming unit and is rotatable about a first axis with respect to the image forming unit to provide access inside the image forming unit; and a reading unit supported by the image forming unit and rotatable about a second axis with respect to the image forming unit, wherein the reading unit includes a conveying unit configured to convey a document, a transparent member, and a reading element configured to read the document conveyed by the conveying unit through the transparent member, wherein a direction in which the document is discharged by the conveying unit intersects with the first direction, wherein, in the first direction, a distance between a position of a center of the image forming unit and the second axis is shorter than a distance between the center position of the image forming unit and the first axis, wherein, in the first direction, a distance between a rear surface of the reading unit and the center position of the image forming unit is shorter than a distance between a rear surface of the image forming unit and the center position of the image forming unit, wherein an opening is disposed on a top surface of the image forming unit between the rear surface of the reading unit and the rear surface of the image forming unit in the first direction, wherein the fixing unit is disposed below the opening in a vertical direction, wherein the opening on the top surface of the image forming unit is an opening from which the heat of the fixing unit is released to outside of the image forming unit, and wherein, with respect to a second direction along the first axis, an end portion, closer to the opening in the end portions of the first axis, locates between the opening and an end portion closer to the opening in the end portions of the second axis.

2. The image forming apparatus according to claim 1, wherein the image forming unit further includes a cartridge having a photosensitive member on which a toner image is to be developed, wherein the cartridge is detachable from the image forming unit in a state where a the discharging tray is opened with respect to the image forming unit, and wherein the cartridge is covered with the discharging tray in a state where the discharging tray is closed with respect to the image forming unit.

3. The image forming apparatus according to claim 2, wherein a movable area of the discharging tray overlaps a movable area of the reading unit.

4. The image forming apparatus according to claim 1, wherein the first axis is parallel to the second axis.

5. The image forming apparatus according to claim 1, wherein the reading unit includes an operation unit supported by the reading unit and is configured to receive an operation for inputting a command to the reading unit, wherein the operation unit is disposed on a side opposite to the second axis with respect to a position of a center of the reading unit in the first direction, and wherein, in the first direction, if a surface on which the operation unit is disposed with respect to the center position of the reading unit is defined as the front side of the image forming unit.

* * * * *